United States Patent [19]

Wolff

[11] 4,047,289

[45] Sept. 13, 1977

[54] METHOD FOR FORMING A SLURRY BATTERY CELL

[75] Inventor: Otto E. Wolff, Weston, Mass.

[73] Assignee: Polaroid Corporation, Cambridge, Mass.

[21] Appl. No.: 694,026

[22] Filed: June 7, 1976

Related U.S. Application Data

[63] Continuation-in-part of Ser. No. 514,458, Oct. 15, 1974, abandoned.

[51] Int. Cl.² .............................................. H01M 4/04
[52] U.S. Cl. .................... 29/623.4; 29/623.5; 429/153; 429/162
[58] Field of Search ................. 29/623.1, 623.4, 623.5; 429/153, 154, 162

[56] References Cited

U.S. PATENT DOCUMENTS

| 3,706,616 | 12/1972 | Bergum et al. | 429/162 |
| 3,740,270 | 6/1973 | Bilhorn | 429/162 X |
| 3,775,188 | 11/1973 | Oltman et al. | 429/162 |
| 3,775,190 | 11/1973 | Oakley | 429/162 |
| 3,907,599 | 9/1975 | Fanciullo et al. | 429/162 X |

Primary Examiner—Carl E. Hall
Attorney, Agent, or Firm—John W. Ericson

[57] ABSTRACT

A method for forming a slurry cell electrode structure which serves as a component of a planar battery. The slurry electrode structure is formed in situ as a particulate dispersion of active material in aqueous electrolyte. The method utilizes a slurry precursor prepared by predepositing a liquid carried dispersion of the particulate active material over the surface of a select component, such as a separator, current collector, or intercell connector of the cell. This deposition is dried and prepared as a subassembly which is appropriately inserted within the multicell pile structure as a step in the manufacture of a multicell battery. By wetting the subassembly with a wash coat of aqueous electrolyte, in situ slurry formation is provided.

11 Claims, 6 Drawing Figures

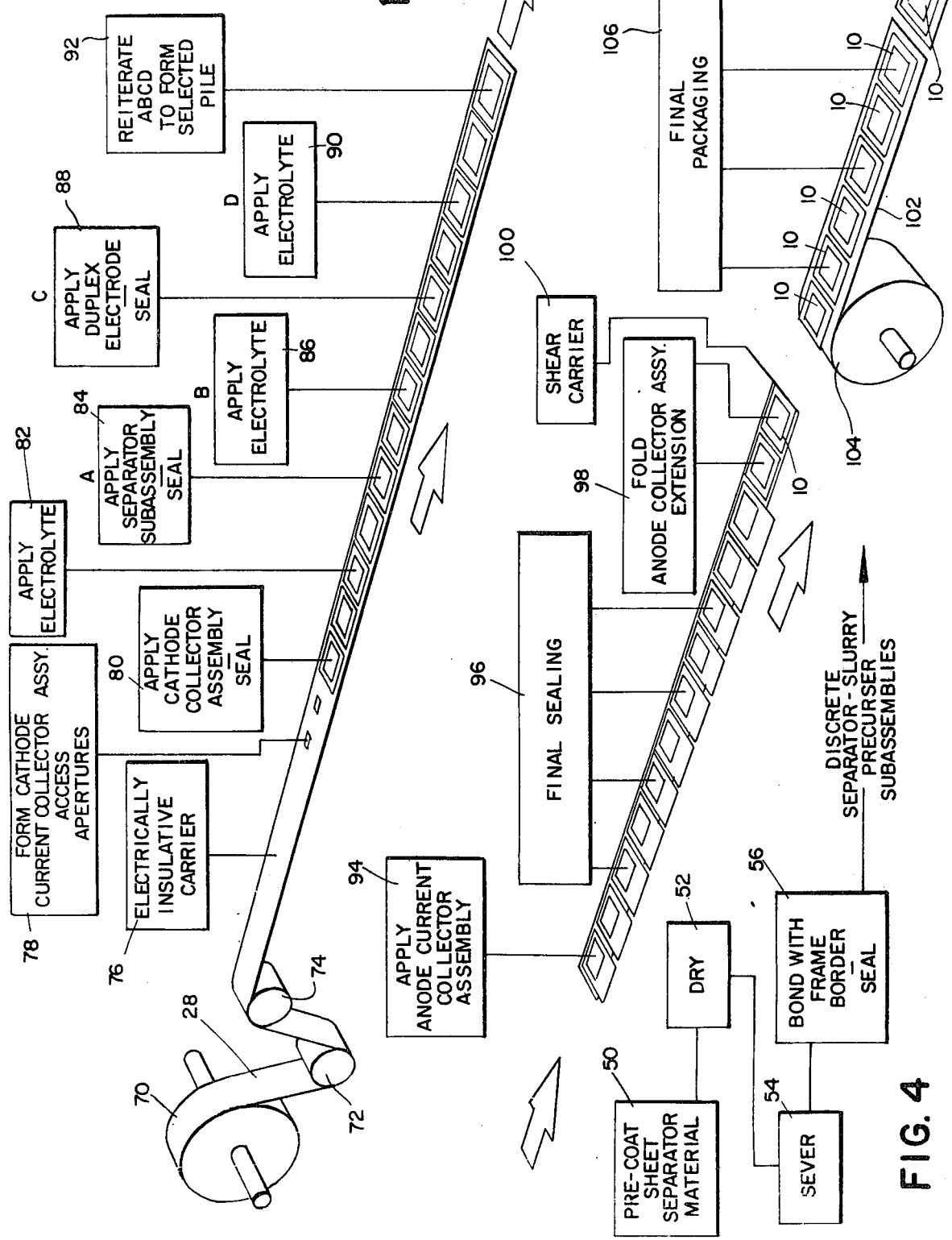

METHOD FOR FORMING A SLURRY BATTERY CELL

This application is a continuation-in-part of my copending U.S. application Ser. No. 514,458, filed on Oct. 15, 1974 for Method for Forming a Slurry Battery Cell and assigned to the assignee of this application, now abandoned.

BACKGROUND OF THE INVENTION

This invention relates to electrical energy power supplies and more precisely, to specialized batteries which have special utility in packs or assemblies comprising a container holding self-developing film units integrated with a battery power supply.

U.S. Pat. Nos. 3,705,542; 3,543,662; 3,543,663; and 3,595,661 relate to photographic film packs comprising an enclosure containing self-developing film units integrated with a power supply system. Such film packs are presently employed exclusively in a highly automated photographic camera sold by Polaroid Corporation of Cambridge, Massachusetts, U.S.A., under the trademark "SX-70".

Essentially, film packs or cassette structures described in those patents are of a disposable nature and comprise an opaque enclosure containing a dark slide for covering an exposure station in a forward wall of the container, a stack of individual "self-developing" film units described, for instance, in U.S. Pat. No. 3,415,644 and others, positioned behind the dark slide, means for urging the stack of film units towards the forward wall to position the uppermost film unit in the stack in the exposure station and a battery power supply for powering electrical mechanisms of the camera designed for using the pack.

A photographic cycle for the above-noted camera involves a somewhat complex series of operational events each imposing electrical power demands and each being controlled by an integrated solid state control circuit. As detailed in U.S. Pat. No. 3,774,516, this control circuit monitors several mechanical manipulations of the instrumentalities of the device involving a dual energization of a d. c. dynamoelectric motor as disclosed in U.S. Pat. Nos. 3,791,278; 3,750,543, 3,805,204 and 3,820,128. The operational events carried out by the camera include those of securing an exposure chamber, reflux optical path conversion, exposure regulation of a film unit, motor driven film unit removal and processing as well as the noted automatic dark slide removal.

To power the camera throughout a series of the above-catalogued operational events, a battery power supply is required which exhibits a low internal impedance and is capable of providing a relatively high current output with multi-cycle capacity. During its powering activity, the battery is called upon to maintain the predetermined voltage levels required for operating integrated logic control circuits.

A particularly desirable attribute of the noted camera-film system resides in the foldability of the camera component thereof into a thin, compact configuration suited for facile portage. The availability of such design compactness stems, in part, from the utilization of a flat battery structure in combination with the film cassette for the power supply of the camera. Of considerable importance to the system, however, by providing a battery which is discardable with an exhausted film cassette, the camera operator is assured of the presence of a fresh power supply upon each replenishment of a film supply to the camera. Essentially, the film pack contained power source has comprised a battery of the type described in detail in U.S. Pat. Nos. 3,543,662; 3,563,805; 3,617,387 and 3,734,780 among others. These flat or planar batteries are primary batteries of the LeClanche type including a zinc anode system, a manganese dioxide cathode system and an aqueous electrolyte of ammonium chloride, zinc chloride and usually a small amount of mercuric chloride. When the film pack is inserted into the camera, the battery integrated therewith is connected to the camera's electrical system to provide a power source of sufficient current capacity and evidencing requisite low internal impedance for operating the camera through a given number of cycles, for instance, ten. When all film units in the pack are exposed and automatically transported from the camera, the pack — containing the integral battery — is discarded.

As described in copending application for U.S. Pat. Ser. No. 411,254 filed Oct. 31, 1973 entitled "Electronic Photographic System" by E. H. Land and assigned in common herewith, it is highly desirable that the thin flat batteries, while still remaining fabricable at a unit cost permitting them to be discarded following the expenditure of the film supply, be capable of providing the power required to charge the capacitor of an electronic flash unit. This current drain capability should be such as to permit recharging over the requisite number of cycles at a relatively rapid rate, for instance, within an interval averaging about 5 seconds. The charging capability for the discardable batteries should be suitable for photographic system energy requirements of, for example, about 100 watt seconds for each photographic cycle.

As alluded to above, such batteries must be compact and specifically configured for effective integration and assembly with the film pack and at the same time provide requisite electrical energy for efficient operation of the camera and related accessories until depletion of the supply of film units in the film pack. Inasmuch as the film-battery combination is designed to be discarded following film supply exhaustion, an economic constraint is involved requiring that the batteries be produced using high volume, low cost procedures which inevitably dictate the involvement of a manufacturing process capable of efficiently assembling batteries and providing maximum production of acceptable batteries with minimum rejects.

In copending applications for U.S. Patent, Ser. No. 495,681 by S. A. Buckler filed Aug. 8. 1974; and Ser. No. 495,628 by E. H. Land, filed Aug. 8, 1974, both applications being assigned in common herewith, flat primary batteries highly suited for the noted photographic application and, particularly, which exhibit current drain capacities for applications providing for the powering of such accessories as electronic flash units are described. One feature of such batteries resides in the formation of at least one cell electrode thereof having a slurry of active particulate material dispersed in aqueous electrolyte. In the latter of the above-identified applications, for instance, a preferred multicell planar primary battery is described in which each positive electrode is formed including a planar cathode current collector carrying on one surface, in order, a first cathode mix comprising a particulate dispersion of cathode mix particles in a binder matrix and a second slurry-type cathode mix comprising a particulate dispersion of cathode mix particles disposed within aqueous electrolyte. The multicell planar batteries incorporating the particulate active material generally include sheet intercell connectors and separators along with border sealing means which are appropriately combined intermediate terminal defining end cathode and anode current collector subassemblies to define pile structures.

SUMMARY

The present invention is addressed to a novel method for forming planar batteries of a variety having a cell electrode structure incorporating a particulate dispersion of active material in aqueous electrolyte. With the technique of the invention the particulate active material dispersion in electrolyte, i.e., the slurry component of a cell, is derived in situ, to permit an important broadening of the process options for a high volume manufacturing system.

As an object and feature, the method of the invention provides for forming a subassembly by depositing dispersions of particulate active material in a liquid carrier over a surface of a selected sheet component of a cell and removing the carrier as by drying or the like. This subassembly then may be positioned at an electrode defining site and subsequently wetted with electrolyte solution.

The selected sheet component of the cell may, for instance, be sheet separator material. Liquid carried particulate material may be deposited in continuous fashion over a continuous web of the material followed by drying and appropriate shearing to form discrete subassemblies. These subassemblies then are introduced into an automated assembly line which, for instance, may be similar to that described in copending application for U.S. Pat., Ser. No. 478,106 by Louis O. Bruneau entitled "Flat Battery and Manufacture Thereof" filed June 10, 1974 and assigned in common herewith.

Other objects of the invention will in part be obvious and will in part appear hereinafter.

The invention accordingly comprises the method possessing the processing steps which are exemplified in the following detailed disclosure.

For a fuller understanding of the nature and objects of the invention, reference should be had to the following detailed description taken in conjunction with the accompanying drawings.

BRIEF DESCRIPTION OF THE DRAWINGS

FIG. 4 is a schematic diagram showing, in block fashion, the functions of fabricating stations utilized to provide discrete separator-slurry precursor subassemblies according to one embodiment of the method of the invention;

FIG. 5 is a schematic diagram showing, in block fashion, the functions of fabricating stations along an assembly line for producing a battery structure in accordance with the method of the invention.

DETAILED DESCRIPTION

Figure 1:
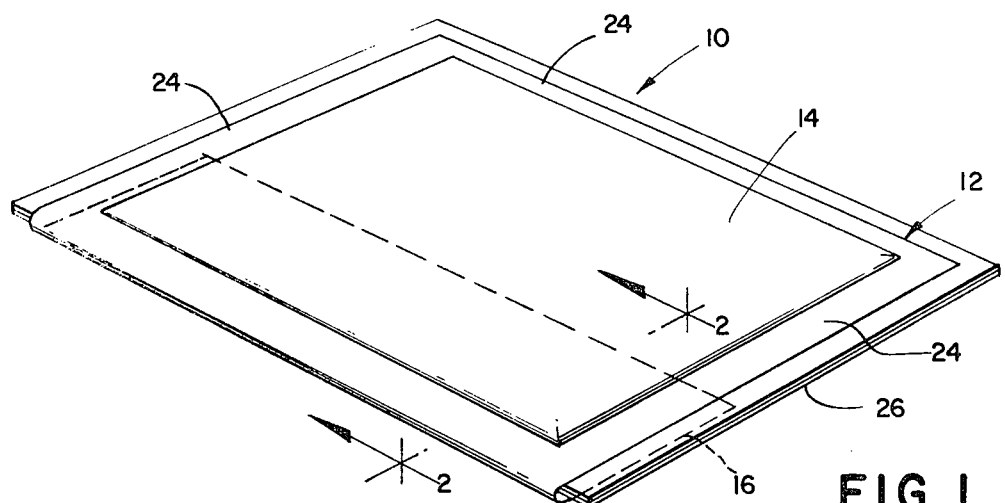
FIG. 1 is a perspective view of a flat primary battery structure fabricated according to one embodiment of the method of the invention.

A multicell flat battery structure fabricated according to the invention is presented generally at 10 in FIG. 1 as it would appear in an electrochemically active state following component build-up and prior to final packaging. Features of the battery structure apparent from this perspective view include an upwardly disposed anode current collector assembly 12, the outwardly facing surface 14 of which is fashioned of a metal to serve as a terminal. Current collector assembly 12 is folded about one side of battery structure 10 such that the terminal defining portion 16 of surface 14, as revealed in FIG. 2 and in phantom in FIG. 1, is located on the lower side of the battery. A cathode electrode collector assembly 20 (shown in FIGS. 2 and 3) is provided as the lowermost component of the battery and includes, in similar fashion as assembly 12, a metallic outwardly facing surface portion 22 which also serves as a terminal surface for the battery structure. With the geometry shown, cathode and anode terminals may be provided in convenient adjacency on one side of the pile assembly. The slightly depressed peripheral portion 24 of the assembly is occasioned from peripheral sealing procedures provided during the hereinafter described assembly of the battery. This depression, as revealed in FIG. 2, necessarily becomes more exaggerated in a sectional view of the battery. Extending from the periphery of the battery and formed in the course of the sealing procedures, is an outer border seal formed of a plurality of frame-type sealing elements which extend inwardly from the border portion shown to select laminar elements of the battery. This lamination, as depicted generally at 26, is somewhat rigid, thereby enhancing the structural integrity of the flat battery configuration.

Beneath the lamination 26 and somewhat coextensive with the border thereof is an electrically insulative sheet carrier material 28. The active electrode surfaces of the battery pile structure 10 are selected having areas to accommodate the intended employment of the battery. For instance, for typical photographic usage as described above an active electrode surface area of about 4 or 5 square inches has been determined to be desirable. Where representative thicknesses of components are described in the discussion to follow, such thicknesses are based upon such an intended utilization.

Figure 2:
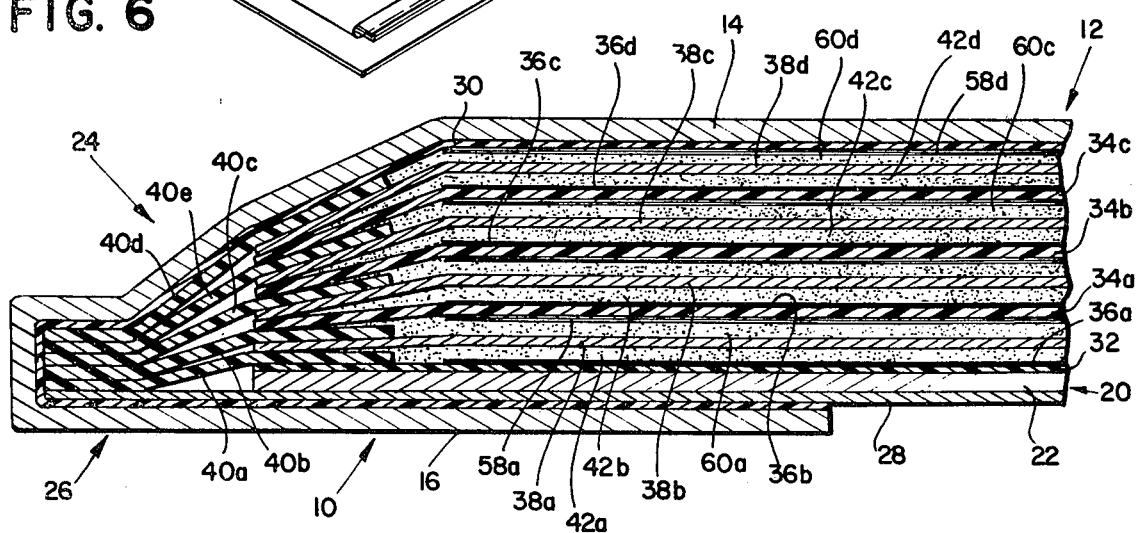
FIG. 2 is a sectional view of a battery structure fabricated according to the invention taken through the plane 2—2 of FIG. 1.
Figure 3:
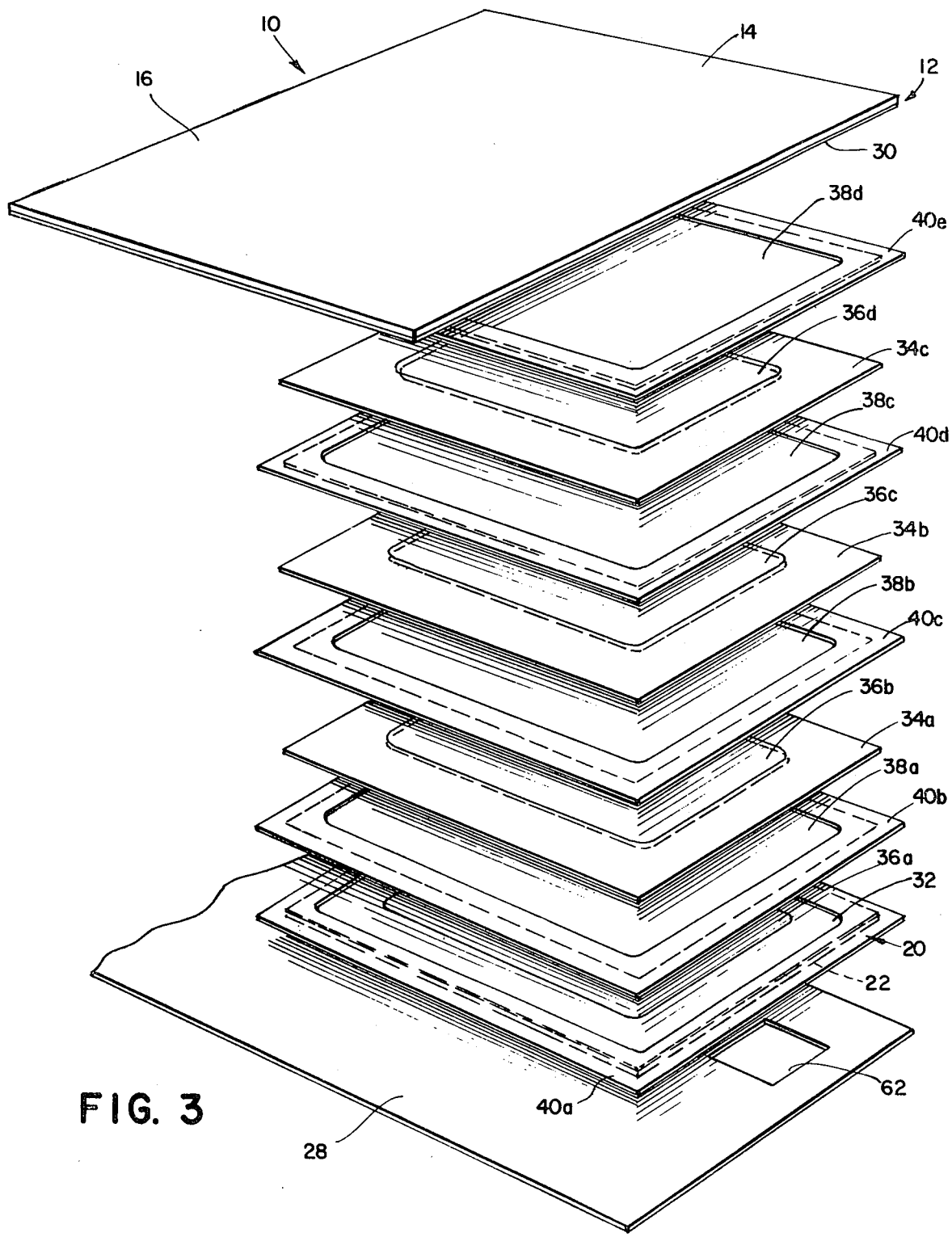
FIG. 3 is an exploded perspective representation of certain components of a battery structure fabricated according to the invention, revealing the relative orientation of sheet-type components thereof.

Referring to FIGS. 2 and 3, the geometry or interrelationships of the discrete components forming battery pile 10 are revealed in detail. As described above, the exposed surfaces of the battery are present as an outer laminate of current collector assemblies 12 and 20. Prefabricated as discrete elements of the system, assemblies 12 and 20 are formed of a metallic sheet foil current collector which, in turn, is laminated to an internally disposed polymeric current collector. In this regard, assembly 12 is formed having a metallic surface current collector 14 serving as a terminal surface laminated with a polymeric current collector 30, while assembly 20 is formed having a metallic current collector outer terminal defining surface 22 laminated with polymeric current collector 32. Preferably, each of the metal current collectors 14 and 22 is provided as an annealed tin coated steel sheet, however, they also may be formed of aluminum or lead sheet material and are preferably on the order of about 2 mils. in thickness for batteries configured for the instant photographic utilization. Polymeric current collectors 30 and 32 may comprise a non-conductive matrix of a thermoplastic material so thoroughly impregnated with conductive particles, as of carbon, for example, as to be somewhat unidirectionally conductive. Preferably all of the polymeric layers of the battery are present as an electrically conductive carbon-impregnated vinyl film sold under the trademark "Condulon" having a thickness on the order of about 2 mils. for the instant application. As is apparent, the assemblies are prelaminated together prior to their assembly within the battery pile. Collector sheets 30 and 32 generally are impervious to electrolyte, are electrochemically inert and are characterized in exhibiting a low resistance to the flow of current from one face to the opposite face thereof. Accordingly, discrete sheets of this same material may be utilized for geometric cell definition and additionally as intercell connectors within a series build-up of cells forming a primary battery pile structure.

Looking to the build-up of the pile structure, battery 10 is seen to be formed of four serially associated cell units which are electrically associated but chemically isolated by intercell connectors 34a–34c. The intercell connectors preferably are formed as discrete rectangular sheets of electrically conductive carbon-impregnated vinyl film, as described earlier in connection with collector sheets 30 and 32 and, for the instant application, having a thickness on the order of about 2 mils.

Looking to the initial cell formed in conjunction with cathode current collector assembly 20, predeposited at the upwardly disposed surface of polymeric current collector sheet 32 is a first cathode mix 36a present in "dry patch" form and made up of materials suited for a Le Clanche electrochemical system. Predeposition of the mix 36a may be carried out by depositing as by printing, silk screening or the like, a patch substantially coextensive with the electrically active portion of the surface of collector sheet 32. Patch 36a is predeposited as an aqueous mixture of particulate carbon, manganese dioxide and binding agent. Other agents which may be included with the mixture for improved bonding and deposition are described in the above-identified application for United States Patent Ser. No. 495,628 as well as in U.S. Pat. No. 3,770,504. Following deposition of the mixture, the aqueous phase thereof is removed by heat induced vaporization, thereby providing a particulate cathode mix dispersion within a binder which adheres in intimate contact with the surface of polymeric collector 32.

Prebonded to the outer peripheral surface of polymeric collector 32 is a rectangular frame-shaped border seal 40a. The inner periphery of seal 40a is configured to surround "dry patch" electrode material 36a, while its outer periphery extends beyond the edges of collector 32 to provide one component of the laminar border seal 26. As is apparent from the drawings, all border seals 40a–40e of the structure 10 are identically configured. The frame seals are continuous and preferably are formed of a material heat sealable both along their commonly juxtaposed surfaces in the final pile structure as well as with the surfaces of an associated polymeric intercell connector and, where appropriate, a polymeric collector sheet surface. Material for the frames should be electrolyte impervious and chemically inert in the battery structure. For example, the frames may be formed of polyvinyl chloride having a thickness, for the present application, of about 5 mils.

Over the site defined by the collector 32-dry cathode patch 36a and coextensive with the surface of patch 36a is deposited an electrolyte. This electrolyte ordinarily will comprise a conventional aqueous solution of ammonium chloride/zinc chloride about 4:1 dispersed in a polymeric thickener such as hydroxyethyl cellulose, for example, on the order of about 5 percent or more. In addition, if preferred, a small quantity of mercuric chloride may be present in the electrolyte. The electrolyte may be deposited utilizing conventional positive displacement techniques, doctoring, silk screening or the like.

Over the site defined by the "dry patch" cathode electrode 36a and gel type electrolyte is positioned a preformed subassembly comprising a sheet of separator material 38a, a frame-shaped border seal 40b and a precoated second cathode mix component which, upon contact with the predeposited electrolyte forms, in situ, an aqueous slurry of cathode mix 42a. To enhance the wetting of the predeposited second cathode mix component, the electrolyte deposited upon "dry patch" cathode 36a may, for instance, include surfactant and wetting agent in addition to the polymeric carrier-dispersant.

The sheet material used for separator component 38a is selected as being wettable by the slurry deposition with which it is in contact as well as being ionically permeable. Additionally, the material should exhibit a texture or porosity, the interstitial openings or channels of which are of adequately fine geometry or size to assure that no migration of the particulate matter of the slurry from the positive electrode environment into the environment of the negative electrode may occur. Among the materials conventionally used as separators, mention may be made of fibers and cellulosic materials, woven or nonwoven fibrous materials such as polyester, nylon, polypropylene, polyethylene or glass. Specifically, a Kraft paper having a thickness of about 2.0 mils has been found to be adequate for the purpose of the instant application. As shown in FIGS. 2 and 3, separator 38a is dimensioned as having the same peripheral shape and size as polymeric collector surface 32 or intercell connectors 34a–34c.

Looking to FIG. 4, the steps in forming the separator-slurry precursor subassembly is revealed in process step fashion. For instance, a continuous supply of sheet separator material having a width corresponding with a desired dimension of the separator portion of assembly 38a is precoated in advantageously continuous fashion using conventional technique as shown at block 50. The material coated is a dispersion of cathode mix particles in an aqueous solution of a water-soluble binder. In addition, the coated material may include coating aids. The cathode particles preferably include manganese dioxide and carbon. As disclosed in the above-identified application for U.S. Pat. Ser. No. 495,628, while various proportions may be employed, it is presently preferred to use about 8 parts of manganese dioxide per part of carbon, by weight.

The binder-dispersant for the slurry precursor is one selected to maintain a homogeneous character for the dispersion therewithin and will exhibit a high tolerance for salt as well as a stability from such effects as syneresis or the like. A particularly desirable characteristic for the agent is one which renders the deposition thixotropic, thereby considerably facilitating coating procedures. Binders-dispersants which may be incorporated within the coatings may be categorized as water soluble natural or synthetic polymers, natural gums, or the like, which in relatively small quantities render the dried dispersion coherent and are soluble in the LeClanche electrolyte solution but not reactive therewith. The slurry precursor is preferably coated in a slurry made up to between 60 and 70 percent solids, by weight. The amount of binder-dispersant is generally less than 3 percent by weight of the coating composition. The consistency of the aqueous coating composition is selected so as to maintain coatability while still providing a concentration of particulate matter per unit area effective to assure that the dispersion is electrically conductive so as to maintain a proper electrode function. In effect, the dispersion, when in ultimate electrolyte slurry form, provides for adequate interparticulate contact to assure electrical conductivity while, at the same time, providing a maximum exposure of particulate surface area to ion conduction as derived from the electrolyte component of the slurry.

As examples of polymeric binding agents effective for the development of the slurry-precursor mixtures of the invention, mention may be made of methylcellulose (sold under the tradename "Methocell 4000" by Dow Chemical Co., Midland, Mich.), polyethylene oxide (sold under the tradename "Polyox" by Union Carbide Corp., New York, N.Y.), hydroxypropyl cellulose (sold under the tradename "Klucel" by Hercules Incorporated, Wilmington, Del.), heteropolysaccharide (anionic) (sold under the tradename "Xanthon Gum" by General Mills Corp., Minneapolis, Minn.), hydroxyethyl cellulose, and poly-2-acrylamido-2-methylpropane sulfonic acid. A natural gum binder agent which may be utilized with the slurry precursor system of the invention may be, for example, guar gum derivative (sold under the tradename "Jaguar" by Stein, Hall & Co., New York, New York). A preferred binder agent particularly useful in preparing cathode slurry precursors is the above-identified poly-2-acrylamido-2-methylpropane sulfonic acid.

As shown at block 52, following deposition of the slurry-precursor material, the continuous web of separator material is dried, for instance, by passing the continuous sheet through an environment of elevated temperature. Following drying, at a convenient time during the subassembly, the now coated separator sheets are severed as indicated at block 54 to provide discrete separator subassemblies of the above-described preferred configuration. Following severing, as shown at block 56, frame type border seals as at 40a are bonded to the "clean" or noncoated side of the discrete separator components to provide the subassembly structure shown in FIGS. 2 and 3.

Returning to FIGS. 2 and 3, the frame-shape border seals as at 40b–40e are formed having inner borders which define rectangular inner openings permitting the formation of the internal cavities of each discrete electrochemical cell. Additionally, the frames are dimensioned such that they extend beyond the periphery of an associated polymeric intercell connector as at 34a and the polymeric collector surface 32. As described above, frames 40b–40e as well as frame 40a are formed of material which is sealable to form the precursor subassemblies as well as to provide for the internal integrity of the pile structure. In forming the discrete separator-slurry precursor subassemblies, frames as at 40b–40e preferably are heat sealed to the noncoated surface of discrete separator sheets.

As represented in FIGS. 2 and 3, the negative electrode of each cell of the battery 10 may be present as a "dry patch" deposition of zinc negative active material as at 58a dispersed in a binder matrix. This material is predeposited upon one side of intercell connector 34a. As in the case of cathode "dry patch" deposition, patch 58a is preformed upon the surface of intercell connector 34a by printing, silk screening or the like an aqueous mixture of particulate negative active material, such as zinc in combination with a binding agent. The aqueous phase of the mixture subsequently is removed by heat induced vaporization. As in the case of "dry patch" deposition 36a, anode deposition 58a is provided substantially coextensive with the electrochemically active portion of the surface of intercell connector 54a. Anode depositions as at 58a are described in more detail in the above-identified application for U.S. Pat. Ser. No. 495,628.

Intermediate the upwardly disposed surface of separator 38a and anode 58a is aqueous gel electrolyte identified at 60a. As in the case of the positive electrode, this electrolyte ordinarily will comprise a conventional aqueous solution of ammonium chloride and zinc chloride in addition to a suitable thickener. Further, a small quantity of mercuric chloride may be present as a corrosion inhibitor.

The first cell build-up is completed with the thermal bonding of the outer peripheries of frames 40a and 40b. The structure of the pile assembly 10 essentially is completed by reiterating the above-described cell construction, the final cell of a four cell pile being formed between intercell connector 34c and anode collector assembly 12. As is apparent, for convenience of illustration, the repeating and identical components of the multicell structure shown in the drawings are provided identical numeration with progressing alphabetical suffixes. Note that the border integrity of the cell structure is provided by mutually bonding, for instance thermally, the outer peripheries of frames 40a–40e to form the earlier described outer rigid border seal 26. It may further be observed that, within each of the series of cells, separators 38a–d are configured to extend sufficiently to separate electrode slurries 42a–d from the environment of the anode. The frames 40a–e provide electrical separation of adjacently disposed electrically conductive polymeric surfaces. With this arrangement, shorting effects or the like are minimized. It will be apparent that by utilizing the slurry-precursor arrangement of the invention, fabrication techniques are simplified and the options available to the process designer are expanded due to the in situ formation of the cathode mix slurries 42a–d.

To provide a convenient adjacency of terminal defining surfaces for the battery structure, extension 16 of anode collector assembly 12 is folded about carrier material 28 to present metallic surface 14 as a terminal defining area at the flat bottom portion of the battery 10. Additionally, an aperture 62 is formed in carrier material 28 (FIG. 3) to expose metallic surface 22 of cathode collector assembly 20.

Figure 6:
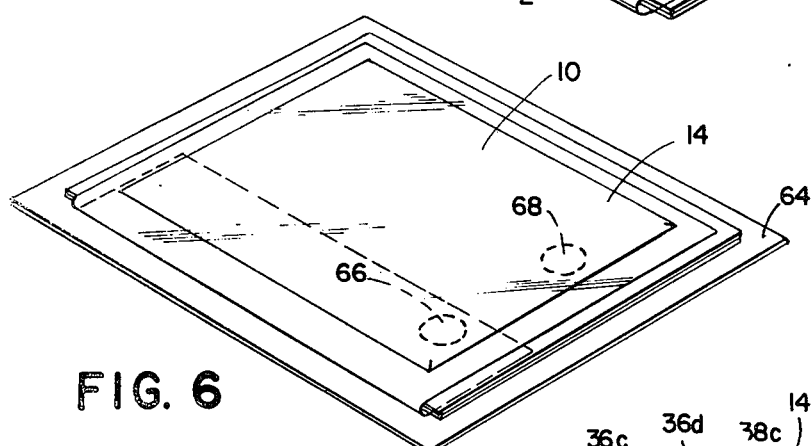
FIG. 6 is a perspective view of a finally packaged battery structure fabricated in accordance with the method of the invention showing certain features thereof in phantom.

As shown in FIG. 6, a final packaging of the battery structure 10 may be provided wherein the multicell unit is adhesively attached to a cardboard stock element as at 64. Cardboard element 64 is formed having access apertures 66 and 68 which are positioned to provide for power system terminal contact respectively with the metallic surface 14 of anode collector assembly 12 as it is extended and folded at 16 as well as to metallic surface 22 of cathode collector assembly 20 as it is exposed through aperture 62 of carrier material 28. The upwardly disposed portion of the assembly then may be covered with an electrically insulative polymeric wrap serving both to assure the insulative integrity of the structure as well as to retain the element 10 upon card 64.

Referring to FIG. 5, a production technique which may be utilized in assembling the battery structure above described is illustrated. This technique utilizes a continuous web carrier described earlier in conjunction with the battery structure at 28. Providing a continuous web, sheet 28 may be drawn from a suitable roll type supply 70 and introduced to a fabricating industrial line through appropriate web drives (not shown) including tension adjusting rolls as at 72 and 74. Web 28 preferably is introduced having a width selected to achieve the geometry described in connection with battery 10 of FIGS. 1 to 3. Accordingly, its width is selected to correspond with the widthwise dimension of the separator-frame subassemblies. Material selected for the web, in addition to being electrically insulative, should be chemically inert and preferably is a plastic material, for instance, a film of an organic polymer which is capable of being heat sealed with adjacent cell border seals and the like. Suitable materials are "Mylar", a product of E. I. DuPont de Nemours and Co. or "Estar", a product of Eastman Kodak, Inc. which is a film of polyethylene terephthalate or an unfilled polyvinyl chloride or the like. For photographic applications as described in the above-reference Pat. No. 3,543,662, sheet or web 28 may be coated with a substance opaque to actinic radiation incident thereon to aid in maintaining the lighttight integrity of any film container within which the batteries are incorporated. A black "Mexican lacquer" coating is found to be suitable for this purpose.

Web or carrier 28 is manuvered through the production or assembly area with an intermittent motion in accordance with the spacing of individual multicell battery or pile assemblies which are made thereon. The provision of the insulative carrier 28 is revealed by function or station block 76 in FIG. 5 while the initial pitch or spacing between the battery units on the carrier web is established by the formation of access apertures 62 as revealed at station or function block 78. By photodetecting an edge of these apertures 62, suitable spacing and registration controls may be provided throughout all of the assembly stations of the production line. While openings 62 may take a variety of shapes, a convenient arrangement is an opening having a rectangular periphery formed forward one side of web 28 in a position such that a terminal defining surface is in the above-described proper position.

As revealed at station function block 80 in FIG. 5, the component build-up upon web 28 is commenced by positioning a discrete cathode current collector assembly 20 in combination with a prebonded frame 40a and "dry patch" cathode material 36a in appropriate registry over access opening 62. "Pick-and-place" technique common in the art is preferred for positioning the collector assembly 20 along with bonded frame 40a upon web 28. Following such placement, the peripheral area of assembly 20 is heat sealed to web 28. As revealed at function block or station 82 in FIG. 5, web 28 is driven to carry the subassembly including current collector assembly 20 and frame 40a to a position where electrolyte is applied coextensive the facing surface of cathode pitch 36a.

As revealed at function block 84, the next step in the assembly is to position a discrete separator-slurry precursor subassembly over the earlier applied electrolyte. Following such positioning, the outer periphery of frame 40b is sealed, as by thermal technique, with the corresponding face of frame 40a. Accordingly, the precoated slurry precursor of the subassembly is wetted with electrolyte and in situ formation of the cathode mix slurry is provided at this site within the initial cell build-up. This positioning of the separator-slurry precursor subassembly and the sealing thereof further is identified by the letter "A".

As shown at the function or station block 86, also identified by the letter "B", electrolyte next is applied over the upwardly facing surface of separator 38a. This second electrolyte application is made over the central portion of separator 38a within the periphery defined by the inner border of frame 40b.

The associated anode for the initial cell is provided as shown at function block 88 and represented by the letter "C" with the positioning over the subassembly of a discrete duplex electrode comprising the intercell connector 34a. As described earlier herein, the intercell connector 34a is formed carrying a "dry patch" anode on its lower surface and a "dry patch" cathode on its now upwardly disposed surface. Following placement of the duplex electrode, the periphery thereof is thermally sealed to the facing or adjacent periphery of frame 40b. At the next succeeding station, as identified at station block 90 and additionally, by the letter "D", aqueous electrolyte is applied over the now upwardly disposed "dry patch" cathode as represented in FIGS. 2 and 3 at 36b. As before, this application of electrolyte serves a dual purpose of providing electrolyte for the positive electrode and as a wetting agent for the in situ development of a slurry cathode mix upon the positioning of a next separator-slurry precursor subassembly, i.e., coated separator 38b as bonded with frame 40b. The build-up of a next serially coupled contiguous cell is commenced with the step described in connection with station block A. It will be apparent that the above-described sequence of construction may be reiterated, as shown at block 92, by select repetition of the series of procedures employed in connection with stations A, B, C, and D. In each reiteration, the dimensional configurations of the discrete elements remain identical as well as their positioning in registration to achieve a proper laminar structure. Looking to FIG. 2, note that a four cell pile structure is illustrated as including separators 38a–38d, first "dry patch" cathode mix depositions 36a–36d, in situ slurry dispersions 42a–42d, frames 40–40e and intercell connectors 34a–34c.

Following the final electrolyte deposition as at 60b (FIG. 2) the multicell assembly is moved by web 28 to a station applying discrete anode current collector assembly 12 as shown in FIG. 5 at block 94. As described earlier, assembly 12 is extended as at 16 to provide a widthwise dimension protruding beyond the edge of carrier web 28. Centered within that portion of the assembly 12, excluding extension 16, is "dry patch" zinc anode material 58d, predeposited thereupon in similar fashion as provided at anode patches 58a–58c. Upon the positioning of the anode current collector assembly 12, the multicell pile subassembly is moved into a final sealing area defined by function block 96. Within this area, the peripheries of the discrete components of the multicell assembly are subjected to a series of heat-pressure sealing operations to assure the integrity of all peripheral seals. Through the use of multiple stage sealing, excessive heat build-up is avoided which otherwise may adversely affect the operative quality of the electrolyte and/or slurry depositions within the battery. It should be understood that each sealing step throughout the above-described assembly procedure preferably is carried out as a separate step in conjunction with the incremental advancement of cell subassemblies upon carrier web 28.

As revealed at block 98, following final sealing, the extension 16 of anode collector assembly 12 is folded around the edge of the multicell assembly to a position wherein polymeric surface 30 thereof abuts against the underside of carrier web 28. As described in connection with FIGS. 1 and 2, this step of fabrication serves to expose metallic surface 14 to the underside of the battery in juxtaposition to the metallic surface 22 of collector assembly 20. A select portion of the surface of metallic layer 22 is accessed through rectangular aperture 62 in web 28. Web 28 then carries the battery assembly 10 to a shearing station as depicted at block 100. At this point, electrically insulative carrier web 28 is sheared to provide discrete battery units such as that shown in FIG. 1. It may be noted that no electrical interconnection is formed between the web-connected multiplicity of pile subassemblies, therefore, no voltage build-up phenomena along the line is encountered with the described technique.

Following shearing of web 28, the discrete battery units 10 are positioned upon a continuous carrier of cardboard stock 102 emanating from roll supply 104. Stock 102 is provided having a widthwise dimension greater than that of the completed battery assembly 10 and an upward facing surface having formed thereon a low temperature heat sealing material upon which battery assemblies 10 are positioned. As depicted generally at function block 106, final packaging of the battery units 10 may then take place upon this insulated carrier 102. In one such packaging arrangement, the forward edge of each battery element 10 is heat sealed to the adhesive coating of the card stock 102 at the forward edge thereof through the use of a simple hot bar technique. The thus attached battery units are then moved by the continuous web card stock through a station wherein a thin electrically insulative film, also electrically insulating, is positioned over the card stock-battery combination in continuous fashion. Upon positioning of this overwrap, the peripheral portion of the card stock surrounding the battery unit 10 is sealed following which the card stock 102 carrying individual battery components 10 is sheared to produce the finally packaged battery configuration described earlier in FIG. 6.

If desired, a slurry precursor in accordance with the invention may be employed as the sole cathode forming agent. For this purpose, rather than forming a conventional dry patch cathode on the cathode collector and intercell connectors as described above, the slurry cathode precursor may be deposited on these components. Instead of the usual 25:1 weight ratio of manganese dioxide to carbon preferred for such dry patch cathodes, the lower weight ratio of about 8:1 is preferred for this construction.

In accordance with this embodiment of the invention, the cathode collector comprising the prelaminated steel sheet 22 and current collector 32, and the intercell connectors 34 a-c, have the cathode precursor composition coated on, by silk screening or the like, in the same manner as the dry patch composition is applied. These coatings are dried as described above. The separator for this purpose is preferably of cellophane, which is not coated initially.

During the assembly of the battery, the dried cathode slurry precursors are wet with aqueous electrolyte, consisting preferably only of water, zinc chloride and ammonium chloride in conventional proportions. The electrolyte solution may be applied by spraying, in amounts of from 35 to 41 percent by weight of electrolyte solution based on the weight of total slurry formed. The resultant battery may correspond to that shown and described in U.S. application Ser. No. 684,370, filed on May 6, 1976 by Edwin H. Land for Electrical Cells and Batteries, and assigned to the assignee of this invention, except for the differences inherent in the method of forming the cathode slurries.

Since certain changes may be made in the above method without departing from the scope of the invention herein involved, it is intended that all matter contained in the above description or shown in the accompanying drawings shall be interpreted as illustrative and not in a limiting sense.

What is claimed is:

1. The method of forming a planar battery cell electrode comprising a particulate dispersion of active electrode material in aqueous electrolyte, comprising the steps of depositing a dispersion of said particulate active electrode material in a solution of water and a water-soluble binding agent on at least a portion of the surface of a select component of said cell, drying said dispersion sufficiently to provide a manipulatory laminar subassembly of said particulate material adhered to said component by said binding agent, positioning said subassembly at an electrode defining site, and wetting said particulate material with an aqueous electrolyte solution in which said binding agent is soluble to dissolve said binding agent and thereby form an aqueous slurry of said particulate material.

2. The method of claim 1 wherein said aqueous dispersion of particulate electrode active material is deposited over the surface of a continuous web of separator material.

3. The method of claim 1, in which said aqueous dispersion of particulate electrode active material is deposited over a portion of the surface of a sheet of conductive plastic material.

4. The method of claim 1, in which said subassembly is positioned in association with the surface of the collector of said electrode.

5. The method of claim 1, in which said dried dispersion of particulate electrode active material is wetted with an aqueous gel electrolyte.

6. The method of claim 2, wherein said coated continuous web is severed to form discrete said subassemblies subsequent to said drying step.

7. The method of claim 1, including the step of attaching said subassembly to a border seal subsequent to said drying and prior to the positioning thereof at said electrode defining site.

8. The method of claim 6, including the step of attaching said subassembly to a border seal subsequent to said drying and prior to the positioning thereof at said electrode defining site.

9. The method of claim 1, wherein said aqueous electrolyte is a gel.

10. The method of claim 1, wherein said particulate electrode material is anode active.

11. The method of claim 1 wherein said particulate electrode material is cathode active.

* * * * *